Dec. 14, 1937.                P. H. J. MARTIN                2,102,275
              AUDIBLE SIGNAL FOR MILKING MACHINES
                      Filed April 28, 1936          2 Sheets-Sheet 1

INVENTOR
P. H. J. Martin
BY
ATTORNEY

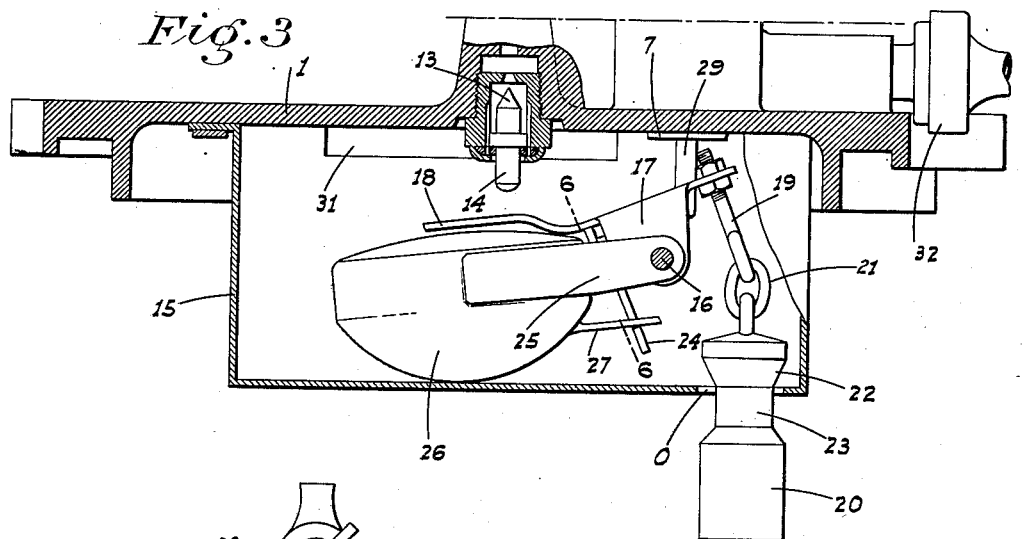
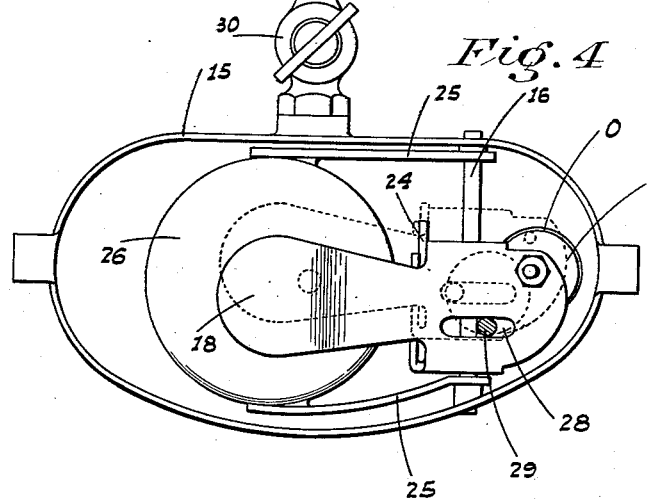
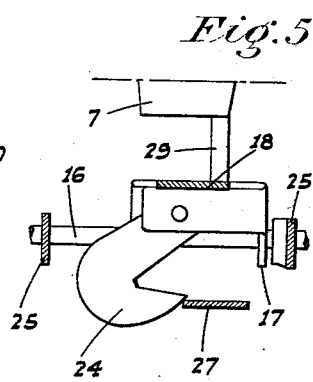
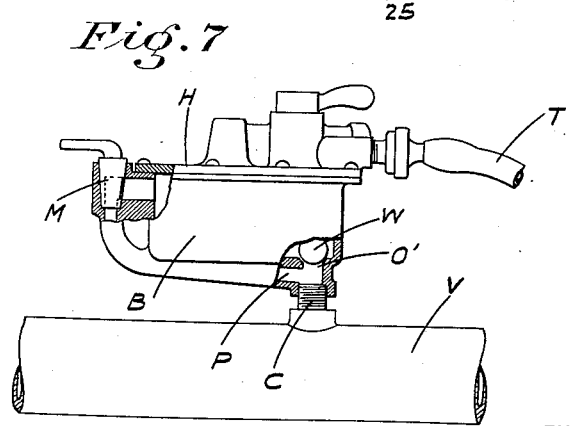
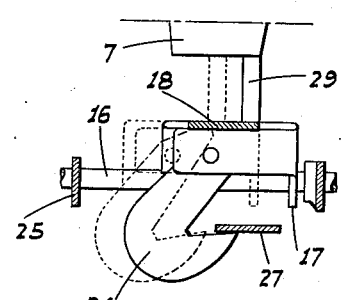

Patented Dec. 14, 1937

2,102,275

UNITED STATES PATENT OFFICE 2,102,275

AUDIBLE SIGNAL FOR MILKING MACHINES

Philip H. J. Martin, Sacramento, Calif.

Application April 28, 1936, Serial No. 76,741

14 Claims. (Cl. 31—58)

This invention relates generally to an audible signal device and is directed particularly and specifically to an audible signal for automatic cow milking machines.

The principal object of my invention is to provide a device which will produce an audible signal whenever the milk from any particular cow has ceased to flow into the bucket of the automatic milking machine, either by reason of the cow being completely milked or because one of the suction cups has become disengaged from its teat.

A further object of my invention is to provide a modified form of signal device adapted to be employed in connection with those automatic milking systems which do not use a milk bucket but connect the milk supply tube directly from the teat cups to a vacuum pipe leading to a central reservoir.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 3 is a similar view illustrating the position of the float and hook mechanism after the float has risen, engaged the hook and returned to a lowered position.

Figure 4 is a top plan view of the float and hook mechanism which controls the whistle valve.

Figure 5 is a fragmentary sectional view on line 5—5 of Figure 2.

Figure 6 is a fragmentary sectional view on line 6—6 of Figure 3.

Figure 7 is a side elevation, partially broken out, illustrating a modified form of my invention.

Referring now more particularly to the characters of reference on the drawings, the numeral 1 indicates a circular head or cover plate for the milk receiving bucket of an automatic cow milking machine of the vacuum actuated type. This head 1 is provided as usual with a central connection 2 adapted to be connected to the pulsator or source of intermittent vacuum.

Figure 1:
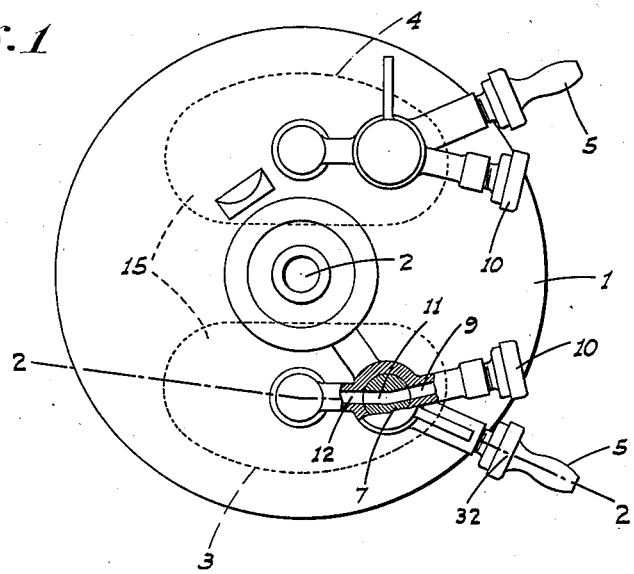
Figure 1 is a top plan view of the head or cover plate for the bucket of an automatic milking machine; the head being provided with my signal device.

The head 1 is provided with two milk intake connections and a whistle actuating mechanism for each as shown generally on Figure 1 as 3 and 4, but for the purpose of this specification only one connection and its cooperating mechanism will be described, since one is a duplicate of the other.

The milk supply hose leading from the teat cups is secured on a milk intake connection 5 secured on the head in communication with one end of a passage 6, the other end of said passage opening into a circular and tapered valve seat bore extending thru the head parallel to the axis thereof. A removable plug valve 7 engages in said bore and is provided with a port 8 adapted to register with passage 6 and afford communication with the interior of the milk bucket to which head 1 is secured.

An additional passage 9 is formed in the head and provides communication between an air whistle 10 and the plug valve seat. The plug valve 7 is also provided with a port 11 to afford communication between passage 9 and another passage 12, leading from the plug valve seat to the inner face of the head 1.

A downwardly opening needle valve 13 having a depending stem 14 is suitably mounted on the inner face of head 1 to control the flow of air thru passage 12.

Removably secured in any suitable manner to the inner face of the head beneath the plug and needle valve is an oval-shaped metallic bowl 15 of sufficient size to enclose the hereinafter described valve operating mechanism.

A transverse pin 16 extends from side to side of the bowl adjacent one end thereof and is pivotally supported on downturned ears 17 disposed intermediate the ends of a plate 18, which extends under the needle valve as well as the plug valve. A depending screw eye 19 is mounted on the end of the plate nearest the plug valve and supports a cylindrical valve and weight unit 20 in suspended relation by means of a link 21. The weight 20 depends thru an opening O in the bottom of the bowl 15, that portion of the weight adjacent and immediately below the floor of the bowl being tapered inwardly as at 22 until materially reduced in diameter as at 23. The weight 20 acts to normally urge the opposite end and upwardly sloping portion of plate 18 against needle valve stem 14 and to keep valve 13 closed. In such position weight 20 also then substantially closes the opening O.

The hook 24 is pivoted on and depends from the lower side of plate 18 at a point intermediate the pin 16 and the needle valve engaging end of the plate, said hook being pivoted for movement in a plane parallel to the axis of the pin.

Two spaced arms 25 are pivoted at one end on pin 16, each adjacent one side of the bowl and outwardly of the ears 17. At their other ends these spaced arms 25 are secured to a float 26 disposed beneath the needle valve engaging portion of plate 18. A relatively short rigid finger 27 is secured to the under portion of float 26 and extends therefrom for engagement with hook 24.

The plate 18 immediately above the pin 16 is formed with a slot 28 extending at right angles to the axis of said pin and an eccentrically disposed pin 29 is secured to and projects downwardly from plug valve 7 into said slot.

A level control pet cock 30 is mounted on one side of the bowl 15 intermediate the top and bottom edges thereof; said bowl also having an overflow slot 31 adjacent the top edge thereof.

Operation

Figure 2:
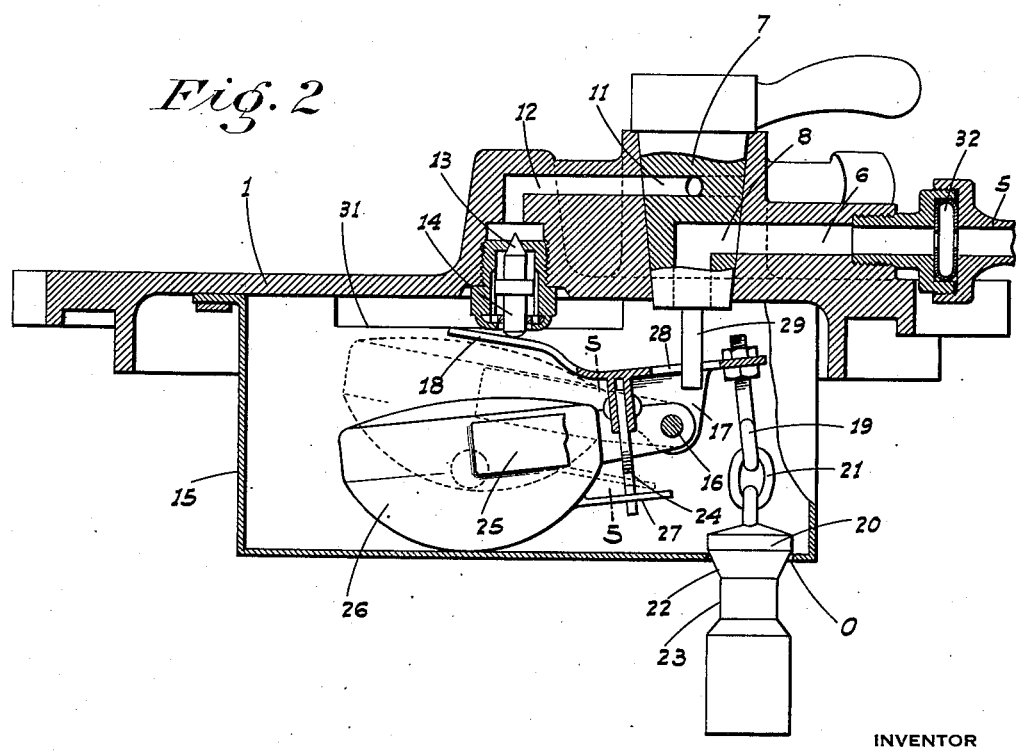
Figure 2 is a sectional elevation on line 2—2 of Figure 1 illustrating the initial position of the float and hook mechanism.

In use, the valve control mechanism is initially set in the position indicated in Figure 2; the float rests on the bottom of the bowl and plate 18 holds valve 13 closed by means of weight 20 which is in such position as to substantially close opening O. At such time, and when the valve 7 is turned to a full open position, the plate 18 is in the position shown in full lines in Figure 4 and the hook 24 is disengaged from finger 27 as shown in Figure 5. It will also be noted that the spacing between arms 25 is considerably greater than that between ears 17 so that said plate 18 may move laterally along pin 16 from the above named initial position.

When the cow milking operation is to begin, the plug valve is inserted in the opening therefor and pin 29 engaged in slot 28 and the plug valve then turned to a position where ports 8 and 11 are in register with their respective passages in the head. With such turning of the plug valve, pin 29 moves plate 18 along pin 16 from the position indicated in dotted lines on Figure 4 to that shown in full lines.

The hook 24 will then rest against finger 27 in the manner illustrated in Figure 5. As the milk from the cow enters thru passage 6 and port 8 and fills bowl 15, the float will rise to the position illustrated in dotted lines in Figure 2 and the hook 24 will drop into engagement with finger 27 as illustrated in Figure 6. The pet cock 30 is opened sufficiently to permit the greatest portion of the milk to escape into the bucket while at the same time maintaining a sufficient quantity in the bowl to hold the float in raised position.

When the cow ceases to give milk and none is flowing into the bowl, the escape of milk thru the pet cock will cause the float to begin to move down toward the bottom of the bowl.

The float is of sufficient size to overcome the effect of weight 20 and as the hook 24 is now engaged with finger 27, the downward movement of the float draws plate 18 away from valve stem 14 and valve 13 begins to open.

Also with the downward movement of the float and the raising of weight 20 the tapered portion 22 of the weight is raised from the opening O so that the reduced portion 23 is adjacent the opening. This permits the immediate escape of all the remaining milk from the bowl which greatly speeds up the emptying of the bowl and the resultant opening of valve 13.

The opening of valve 13 causes the vacuum in the bucket to draw air thru the air whistle 10 and provide an audible signal in order that the attendant may hear the same and turn the plug valve 7 to an "off" position which then shifts plate 18 back to the initial position free of the hook and permits weight 20 to again move the plate against the stem of valve 13 and close same. The turning of the plug valve also positively prevents further actuation of the air whistle until such valve is again turned to an open position.

If desired another whistle 32 of different tone may be inserted by suitable means between milk intake connection 5 and passage 6. This whistle will give an audible signal if the milk supply tube should break or a teat cup become disengaged from the cow permitting air to enter the supply tube and actuate the whistle. As air is drawn through the whistle 10, the vacuum is materially reduced in the bucket causing a reduction of vacuum in the teat cups and thus relieving the cow after milk has ceased to flow.

The modified form of my invention as shown in Figure 7 is adapted for use on automatic cow milking equipment where no milk bucket is used and the milk from the cows is carried from the supply tube thru a vacuum pipe into a central reservoir.

In this form of my invention, the head H and bowl B are arranged as a unit for the pet cock and overflow slot are eliminated.

A passage P leads from the upper portion of the bowl to a point immediately below opening O'; a ported plug valve M being provided to open and close the passage. A connection C supports the unit and provides communication from opening O' or passage P into the milk and vacuum pipe V.

The construction of the head and mechanism within the bowl are the same as in the first described type of device with the exception that the weight W is of the ball type and does not extend thru opening O' but merely forms a closure therefore in the manner of a ball check valve. However this weight W does not at any time completely close the opening and permits a certain amount of milk to escape therethru. The operation of this modified form of my invention is substantially the same as heretofore described; the milk entering the unit thru the supply tube T and discharging from the bowl thru passage P and opening O'. When the milk ceases to flow into the bowl from tube T, the milk flowing out of opening O' and lowering the level in the bowl causes the float mechanism to open the air whistle valve and to cause an audible signal to be given. Of course when weight W is raised from opening O' the milk escapes faster from the bowl and speeds up the actuation of the valve opening mechanism for the giving of the signal. This signal actuating mechanism is shut off and reset in the same manner as heretofore described relative to the other form of my invention.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A signal device for a vacuum cow milking machine including a whistle mounted in connection with the machine, a normally closed valve to control the actuation of the whistle and means to open the valve upon completion of the milking operation.

2. A signal for a vacuum milking machine including a whistle, a normally closed valve to control the actuation of the whistle and float actuated means to open the valve upon completion of the milking operation.

3. A signal for an automatic cow milking machine including a whistle, a valve to control the actuation of the whistle, means normally maintaining the valve closed and float actuated means to move said first named means and open the valve upon completion of the milking operation.

4. In a vacuum cow milking machine, a bowl having a head plate and provided with a milk intake passage and a vacuum passage adapted for connection to a source of negative pressure to draw milk thru the intake passage into the bowl, another passage in the head open to atmosphere, an air whistle in the last named passage, a valve closing the whistle passage as long as the bowl is substantially full of milk, and means to open the valve upon the emptying of the bowl when milk ceases to be drawn into the bowl.

5. In a vacuum cow milking machine, a bowl having a head plate and provided with a milk intake passage and a vacuum passage adapted for connection to a source of negative pressure to draw milk thru the intake passage into the bowl, another passage in the head open to atmosphere, an air whistle in the last named passage, a valve closing the whistle passage as long as the bowl is substantially full of milk, means to open the valve upon the emptying of the bowl when milk ceases to be drawn into the bowl, and selectively operable means to close the valve when the bowl is empty.

6. In a vacuum cow milking machine, a bowl having a head plate and provided with a milk intake passage and a vacuum passage adapted for connection to a source of negative pressure to draw milk thru the intake passage into the bowl, another passage in the head open to atmosphere, an air whistle in the last named passage, a self-opening valve in the whistle passage, means to hold the valve closed as long as the bowl is substantially full of milk, and float controlled means to withdraw said valve holding means from the valve to allow the same to open upon the emptying of the bowl when milk ceases to be drawn into the bowl.

7. A structure as in claim 6 with selectively operable means acting on said valve holding means to restore the same to a valve closing position when the bowl is empty.

8. A device as in claim 4 in which the bowl is provided with a drain opening, and means acting to increase the effective area of said opening as the bowl empties.

9. A device as in claim 6 in which the bowl is provided with a drain opening, and means mounted in connection with the valve holding means to increase the effective area of the opening as the bowl empties.

10. In a vacuum cow milking machine, a bowl having a head plate and provided with a milk intake passage and a vacuum passage adapted for connection to a source of negative pressure to draw milk thru the intake passage into the bowl, another passage in the head open to atmosphere, an air whistle in the last named passage, a self-opening valve in the whistle passage, said valve having a depending stem whose upward movement closes the valve, a depressible plate in the bowl under the stem to engage the same, means acting on the plate to cause the same to normally engage the stem and move the same upwardly, and float controlled means in the bowl to engage the plate when the bowl becomes substantially full of milk and to depress said plate to allow the valve to open by the emptying of the bowl due to the cessation of the flow of milk into the bowl.

11. A structure as in claim 10 with selectively operable means to release the plate from the float controlled means and allow the plate to reassume its stem engaging position.

12. In a vacuum cow milking machine, a bowl having a head plate and provided with a milk intake passage and a vacuum passage adapted for connection to a source of negative pressure to draw milk thru the intake passage into the bowl, another passage in the head open to atmosphere, an air whistle in the last named passage, a self-opening valve in the whistle passage, said valve having a depending stem whose upward movement closes the valve, a depressible plate in the bowl under the stem to engage the same, means acting on the plate to cause the same to normally engage the stem and move the same upwardly, and a float pivoted in the bowl, initially disengaged catch means between the float and plate to connect the plate and float together when the float rises a predetermined distance whereby when the float drops the plate will be lowered and the valve allowed to open.

13. A device as in claim 12, in which the plate is mounted for lateral movement to disengage the catch means, and selectively operable means to shift the plate in such direction to allow the plate to again engage the valve stem.

14. A signal device for a vacuum cow milking machine including an audible signal mounted in connection with the machine, a normally closed valve to control the actuation of the signal and a means to open the valve upon completion of the milking operation.

PHILIP H. J. MARTIN.